C. H. BISSELL & H. P. HASTINGS.
METER TESTING CONNECTION.
APPLICATION FILED NOV. 15, 1913.

1,300,690.

Patented Apr. 15, 1919.
4 SHEETS—SHEET 1.

WITNESSES:

Carl H. Bissell
Harold P. Hastings,
INVENTORS

BY
ATTORNEYS

C. H. BISSELL & H. P. HASTINGS.
METER TESTING CONNECTION.
APPLICATION FILED NOV. 15, 1913.

1,300,690.

Patented Apr. 15, 1919.
4 SHEETS—SHEET 3.

WITNESSES:

INVENTORS

BY

ATTORNEYS

UNITED STATES PATENT OFFICE.

CARL H. BISSELL AND HAROLD P. HASTINGS, OF SYRACUSE, NEW YORK, ASSIGNORS TO CROUSE-HINDS COMPANY, OF SYRACUSE, NEW YORK, A CORPORATION OF NEW YORK.

METER-TESTING CONNECTION.

1,300,690.

Specification of Letters Patent.

Patented Apr. 15, 1919.

Application filed November 15, 1913. Serial No. 801,300.

*To all whom it may concern:*

Be it known that we, CARL H. BISSELL and HAROLD P. HASTINGS, citizens of the United States, and residents of Syracuse, in the county of Onondaga and State of New York, have invented a certain new and useful Meter-Testing Connection, of which the following is a specification.

This invention has for its object a meter testing system comprising a connection or device or a combined meter testing plug receptacle and connector block by means of which a testing meter can be readily connected in the feed circuit, in series with the regular meter without interrupting the flow of current in the load circuit, and it consists in the novel combinations and constructions hereinafter set forth and claimed.

In describing this invention, reference is had to the accompanying drawings in which like characters designate corresponding parts in all the views.

This meter testing connection comprises generally means by which the load circuit and the regular meter circuit are normally connected in series in the main circuit, said means being operable to connect one side of the load circuit and the regular meter circuit in multiple in the main circuit and to connect the regular meter circuit in series with the testing meter. More specifically considered, the meter testing connection includes a pair of conductors designed to be connected respectively to one leg of a feed circuit and one leg of a load circuit, a second pair of conductors, the units of which are designed to be connected in the other legs of the feed circuit and the load circuit, respectively, a pair of terminals for connection with the series coils of a regular meter, one of which terminals is permanently in circuit with one of the conductors of the first pair, a switch member having a conductor electrically connected to the other terminal and normally in contact with another conductor of said pairs, means for short circuiting a pair of the conductors and operating the switch member, said means having a conductor for engaging the switch conductor and being designed to be connected in the testing meter circuit, and a second pair of terminals designed to be connected in the regular meter circuit and with the other two of the pairs of conductors respectively. The meter testing connection, as illustrated in Figs. 1 to 7, is adapted to a three wire system and as shown in Fig. 8 is adapted to a two wire system.

Figure 7:
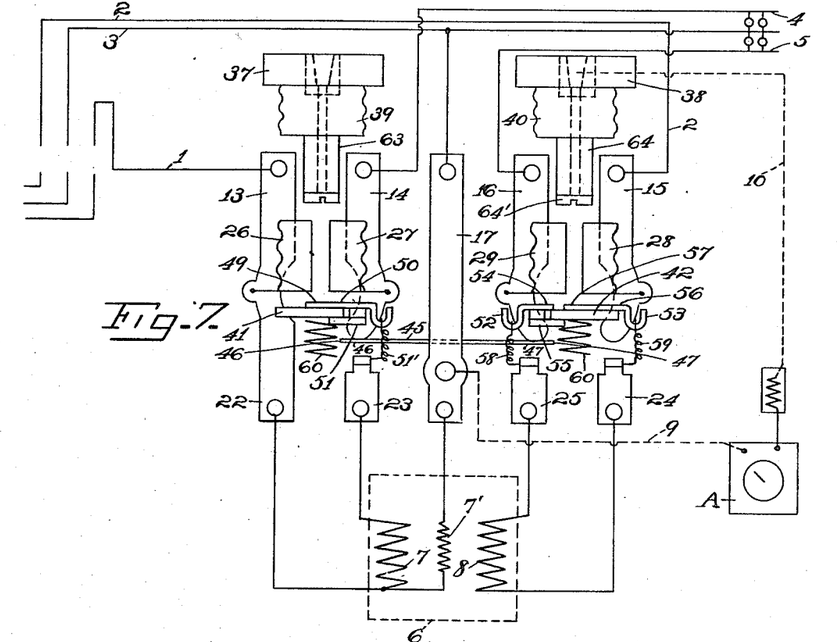
Fig. 7 is a diagrammatic view illustrating the electrical connections of this device.
Figure 8:
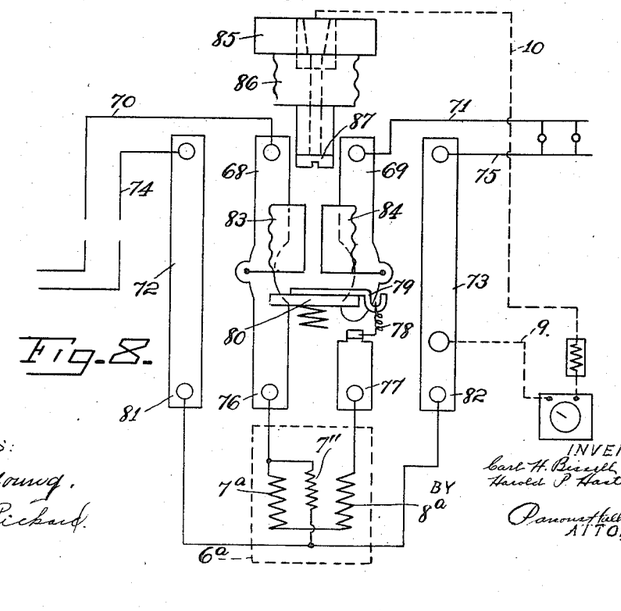
Fig. 8 is a diagrammatic view of our meter testing connection when constructed to be used in connection with a two wire system.

1 and 2 designate respectively the outside mains, and 3 the neutral main of the three wire system. 4 and 5 are the legs of the load circuit, 6 designates the regular meter as a whole, the meter having the usual coils 7 and 8 connected in series with the feed or main circuit and the load circuit, these coils being illustrated in Fig. 7 as in series, respectively, with the outside main 1 and the leg 4 of the load circuit and with the leg 5 of the load circuit and the other outside main 2 through our electrical connection.

A designates the testing meter the terminals of which are designed to be connected, in this embodiment of our invention, to the neutral main by a wire 9 and by a wire 10 to another portion of this meter testing connection which operates to connect the meters 6 and A in series and in the main circuit.

This meter testing connection comprises a base including a block 11, and a socket or receptacle block 12 mounted on the block 11, two pairs of conductors mounted on the block 12, the units of one pair being designed to be connected respectively in series with one of the outside mains 1 or 2 and one of the legs 4 or 5 of the load circuit, and the units of the other pair of conductors being designed to be connected respectively to the other outside main and the other leg of the load circuit, two pairs of terminals on the base and connected respectively to the coils of the regular meter, switch members normally arranged to complete the circuit between the meter coils and the load circuit, and between the main 2 and the meter coil 8, a normally idle conductor on the base, means for short circuiting each pair of conductors and moving said switch members to break the connection between the regular meter and the load circuit and one of the outside mains, and to make connection with the idle conductor whereby the load circuit is connected directly across the outside mains and the coils of the meter are connected together in series.

13 and 14 designate one pair of conductors, 15 and 16 the other pair of conductors and 17 the neutral conductor, the conductors 13 and 15 being described herein as the outside conductors as they are connected to the outside mains 1 and 2, and the conductors 14 and 16 being called load conductors as they are connected to the legs 4, 5 of the load circuit. The neutral conductor 17 is connected to the neutral wire 3 of the feed circuit. Said conductors 13, 14 and 15, 16 are preferably carried by the receptacle block 12 on the under side thereof and are designed to lie in grooves 18 in the upper face of the block 11. The conductor 17 is mounted on the block 11 in a suitable groove 19 therein. The conductors are thoroughly insulated from each other when the blocks 11 and 12 are assembled by barriers 20. The blocks 11 and 12 are held together by suitable screws 21.

22, 23 and 24, 25 are pairs of meter terminals corresponding to the conductors 13, 14 and 15, 16 and normally connected to said conductors, with the exception of the terminal 22, through the switch members to be described. The terminal 22 is permanently connected to, that is always in circuit with, the conductor 13, while the terminals 23, 24 and 25 are mounted on the block 11 in grooves 18, and are alined with the bars 14, 15 and 16. The means for short circuiting the pairs of bars 13, 14 and 15, 16 comprises divided threaded sockets or sleeves, the sections 26, 27 and 28, 29 of which constitute separate terminals connected respectively to the bars 13, 14 and 15, 16, these sections 26, 27 and 28, 29 being located in sockets 30, 31 in the block 12.

Figure 5:
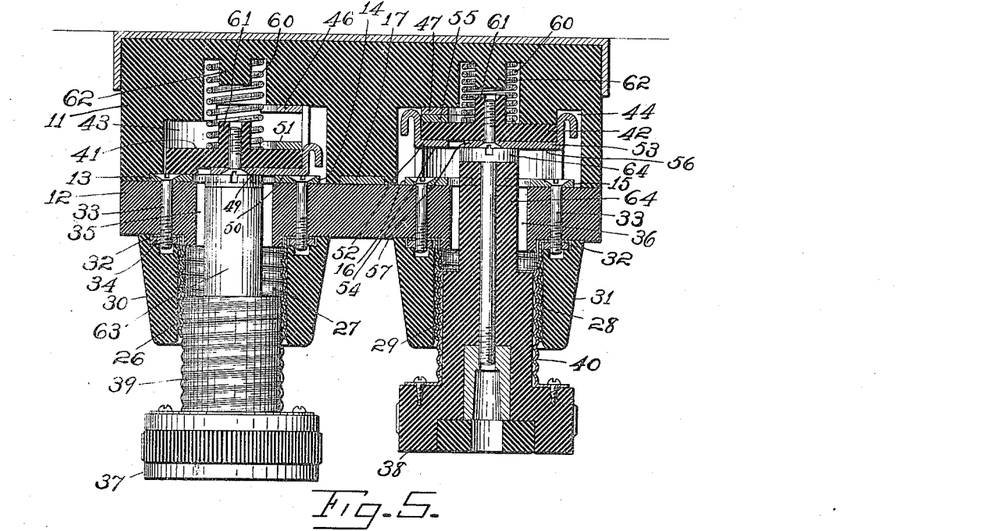
Fig. 5 is a cross-sectional view on line 5—5, Fig. 1.
Figure 6:
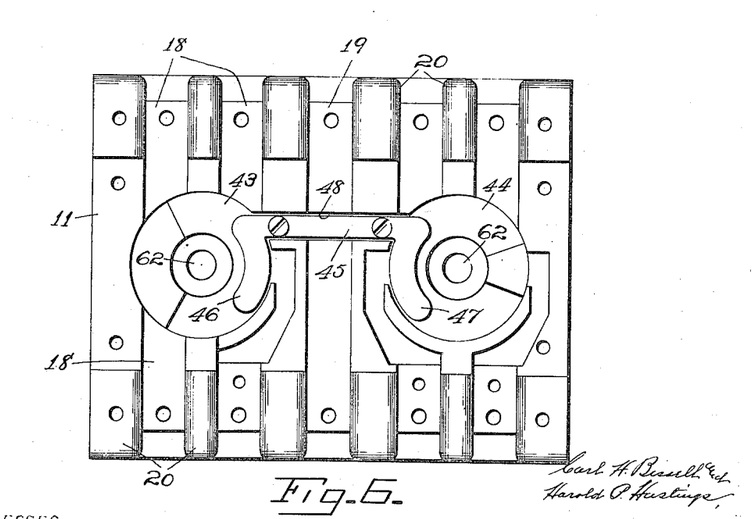
Fig. 6 is a plan view of the connector block, the receptacle block and some of the electrical connections being removed.

As shown in Fig. 5, each terminal 26, 27, 28 and 29 is formed with a base flange 32 and is connected to the bar 13, 14, 15 or 16 by a screw 33 extending through the block 12 and threading into a plate 34 overlying the base flange 32, the screws also extending through the bar 13, 14, 15 or 16. The bars extend around socket holes 35, 36 in the block 12, which holes are alined with the sockets 30, 31. These sections openings of the sockets 26, 27, 28 and 29 are normally separated so that no current passes therethrough and are connected by plugs 37, 38 having plug conductors 39, 40 which screw into the pairs of sleeve terminals 26, 27 and 28, 29 and electrically connect the sections thereof.

Figure 1:
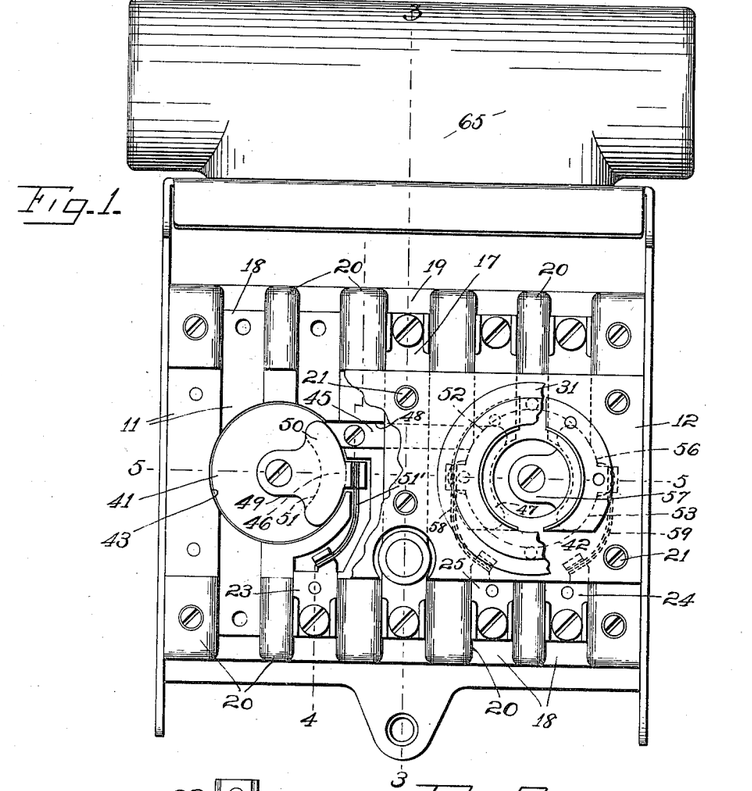
Figure 1 is a top plan of the box or casing of the plug receptacle, the cover of the casing being removed and the receptacle block being partly broken away.
Figure 2:
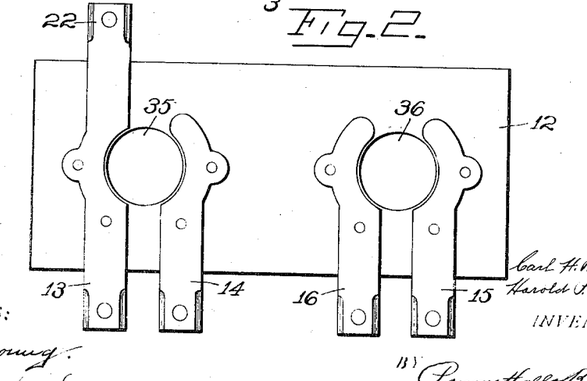
Fig. 2 is an inverted plan view of the receptacle block.
Figure 3:
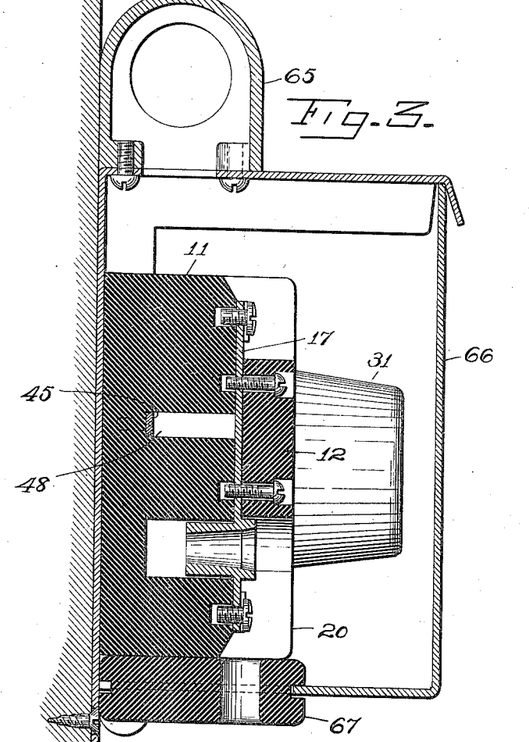
Figs. 3 and 4 are cross-sectional views on lines 3—3 and 4—4, Fig. 1.
Figure 4:
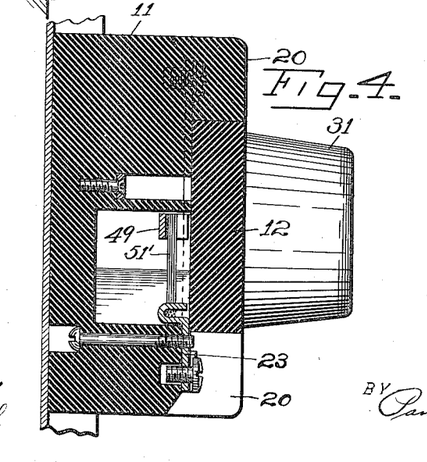

41 and 42 are the switch members which are movable in recesses 43, 44, Figs. 1 and 5 formed in the block 11 and normally covered by the block 12 and located beneath, or in axial alinement with, the openings 35, 36 in the socket block 12.

45 is the normally idle conductor mounted on the base and preferably on the block 11, this conductor having terminals 46 and 47 located in the recesses 43 and 44 on the bottoms thereof, said conductor lying in a channel 48 connecting the recesses. The switch member 41 is provided with a conductor or contact 49 exposed at 50 and 51 on opposite faces of the switch member and arranged so that the surface 50 normally engages the conductor 14, and the surface 51 moves into contact with the terminal 46 of the idle bar 45, and said conductor or contact 49 is connected by means of a flexible wire 51' to the meter terminal 23. The switch member 42 is provided with two conductors or contacts 52 and 53, the conductor or contact 52 having exposed surfaces 54 and 55 for engaging respectively the load circuit bar 16 and the terminal 47 of the idle bar 45; and the conductor 53 having a surface 56 designed to normally engage the outside conductor bar 15, and it also having a centrally located contact 57 for a purpose to be hereinafter described.

The conductors 52, 53 are connected respectively to the meter terminals 25, 24 by conductors or wires 58, 59.

The members 41 and 42 are in the form of disks of insulation which substantially fit within the recesses 43, 44 and the conductors or contacts are mounted thereon in any suitable manner and said members are normally pressed into their normal position by springs 60 seated in the bottoms of the recesses and encircling the bosses as 61 on the members 41 and 42, and the bosses 62 projecting from the bottoms of the recesses. The members are shifted against the tension of the springs by shifting arms 63 and 64 projecting in advance of the plugs 37 and 38, the arm 63 being merely a shifting arm serving to depress the member 41 to break the circuit between the bar 14 and contact 49 of the switch member and to close the circuit between the said contact 49 and the idle bar 45. The arm 64 of the plug 38 has a conductor 64' which makes contact with the central terminal 57 of the member 42 and in addition shifts the member 42 against the tension of the spring to break the circuit between the bar 16 and conductor 52 and the bar 15 and the conductor 53, and close the circuit between the conductor 52 and the idle bar 45.

The recesses 43 and 44 are of greater diameter than the openings of the sockets 30, 31 so that the bars 13, 14, 15 and 16 extend across the open ends of the recesses and hence the conductors of the switch members 41 and 42 can readily make contact therewith.

In operation the circuit normally flows through the outside main 1, bar 13, meter coil 7, terminal 23, switch contact 49, load circuit bar 14, load circuit branches 4, 5 load circuit bar 16, conductor 52 of the switch 42, wire 58, meter terminal 25, meter coil 8, meter terminal 24, wire 59, conductor 53, outside bar 15, and outside main 2.

When it is desired to test a meter the plugs 37 and 38 are screwed into the sockets containing sleeve terminals 26, 27 and 28, 29; thereby short circuiting the meter coils 7 and 8 and shifting the switch members 41 and 42.

One wire 9 of the test meter A is plugged into a suitable opening in neutral bar 17 and the other wire 10 of the test meter is inserted into a socket in the plug 38.

Now the current travels as follows—outside main 1, outside bar 13, terminal 26, plug conductor 39, terminal 27, load circuit bar 14, load circuit legs 4, 5, load circuit bar 16, sleeve section 29, plug conductor 40, sleeve section 28, outside bar 15 and outside main 2.

The current also travels from the bar 13 through the meter coil 7, meter terminal 23, wire 51', conductor 49 of the switch 41, idle bar 45, conductor 52 of the switch 42, wire 58, meter terminal 25 through the meter coil 8, meter terminal 24, wire 59, conductor 53, of the switch 42, conductor 64' of the plug 38, and wire 10 through the testing meter and to the neutral conductor 17, thus connecting one side of the load circuit and the meter circuit in multiple in the feed circuit and connecting the regular meter in series with the testing meter. Short-circuiting of the load circuit is prevented by the usual resistance 7'.

The casing is in the form of a two-part box to one end of which a conduit connection 65 is applied, the removable cover 66 of the box being substantially one-half thereof and having a removable section or entrance piece 67 of insulation through which the wires are attached. The cover 66 is attached in position in any suitable manner and when attached is designed to be sealed. The casing *per se* forms the subject matter of another application.

When the meter testing connection is adapted for a two-wire system, but one plug similar in construction to the plug 38 is used which is connected in one leg of the testing circuit, the other leg of the test circuit being connected to one of the main conductors.

In Fig. 8, is illustrated diagrammatically this meter testing connection adapted to a two-wire system and for convenience the pairs of conductors are differently arranged from the arrangement in the connection for a three-wire system.

68 and 69 designate one pair of conductors connected respectively to one leg 70 of the feed circuit and to one leg 71 of the load circuit, and 72 and 73 illustrate the other pair of conductors connected respectively to the other leg 74 of the feed circuit and the other leg 75 of the load circuit.

76 and 77 are terminals, one being permanently in circuit with, and usually formed integral with, the conductor 68 of the first pair of conductors and the other terminal 77 being in electrical connection through the wire 78 with the conductor 79 of the switch member 80 which is similar in construction and location to the switch member 41, the switch member 80 being normally arranged with its conductor 79 in contact with the other conductor 69 of the first pair of conductors.

81 and 82 are terminals adapted to be connected in the regular meter circuit and being in this adaptation of our invention permanently connected respectively to the other pair of conductors 72, 73 and usually formed integral therewith. 83 and 84 are the sectional sleeve terminals normally separated from each other and electrically connected respectively to the conductors 68 and 69.

85 is a plug having a plug conductor 86 for threading into the sectional sleeve terminals 83, 84 and electrically connecting the same, said plug also having a central conductor 87 projecting in advance of the plug conductor 86 and arranged to engage the switch member 80 to operate the same and to make electrical contact with the conductor 79 of said switch. The conductor 87 is designed to be connected to one leg 10 of the testing meter circuit, the other leg 9 of which is provided with a plug for entering a socket in the conductor 73.

In the operation of this form of our meter testing connection, the current normally flows from the service wire 70 through conductor 68, terminal 76, through the series coils 7ª and 8ª of the regular meter 6ª, terminal 77, wire 78, switch conductor 79, conductor 69, through the load circuit branches 71 and 75, conductor 73, terminal 82, through the meter circuit to terminal 81, conductor 72, and feed wire 74.

When the plug 85 is inserted into the sleeve sections 83, 84 and the testing meter circuit is plugged into the conductor 73, the current flows from the service wire 70, conductor 68, sleeve section 83, plug conductor 86, sleeve section 84, conductor 69, load circuit branches 71 and 75, conductor 73, terminal 82, through the meter circuit to the terminal 81, conductor 72 and service wire 74.

The current also passes from the conductor 68 to the terminal 76, through the series coils of the meter, the terminal 77, through wire 78, switch conductor 79 to central plug conductor 87, meter testing wire 10, through the testing meter to the wire 9 to the conductor 73, terminal 82 through the meter circuit to the terminal 81, conductor 72, and service wire 74. Short-circuiting of the load circuit in this form of our invention is prevented by the usual resistance 7".

What we claim is:—

1. A meter testing system comprising a plurality of conductors, some being connected between the meter and the feed circuit and others between the meter and the load circuit, one of the conductors being permanently connected to a leg of one of said circuits and to the meter, and the connections between the meter and a second one of the conductors, the latter conductor being connected to a leg of the other circuit, including a movable conductor connected in circuit with the meter and normally in circuit with said second conductor, means for short circuiting said two of the plurality of conductors, at a point between the movable conductor and the circuits connected to said two conductors, and for breaking the circuit between the movable conductor and said second conductor, and a meter testing circuit having one leg designed to be connected in series with the first-mentioned meter, at a point between said movable conductor and the feed circuit, and having its other leg provided with means for electrical connection with another of said plurality of conductors the latter conductor being connected to the feed circuit, substantially as and for the purpose described.

2. A meter testing system comprising a pair of conductors designed to be connected in circuit respectively with one leg of a feed circuit and one leg of a load circuit, a terminal normally in circuit with the meter, a movable switch member, a conductor carried by the switch member and connected in circuit with the terminal and normally in circuit with one of the pair of conductors, means for short-circuiting the pair of conductors, at a point between the conductor carried by the switch member and the circuit legs connected to said pair of conductors, and for operating the switch member to break the circuit between the conductor carried thereby and said one of the pair of conductors, said means being provided with a conductor for making electrical connection with the conductor carried by the switch member, and a meter testing circuit having one leg designed to be connected to the conductor of said means and its other leg designed to be connected to the feed circuit, substantially as and for the purpose described.

3. A meter testing system comprising a pair of conductors designed to be connected respectively to one leg of a feed circuit and one leg of a load circuit, a second pair of conductors, the units of which are designed to be connected in the other legs of the feed circuit and the load circuit respectively, a pair of terminals for connection with the series coils of a regular meter, one of which terminals is permanently in circuit with one of the conductors of the first pair, a switch member having a conductor electrically connected to the other terminal and normally in contact with another one of said conductors connected to the feed and load circuits, means for short circuiting a pair of said conductors connected to the feed and load circuits and for operating the switch member, said means having a conductor for engaging the switch conductor, and being designed to be connected in the testing meter circuit, and a second pair of terminals designed to be connected in the meter circuit and respectively with the others of said conductors connected to the feed and load circuits, substantially as and for the purpose specified.

4. A meter testing system comprising a pair of conductors designed to be connected respectively to one leg of a feed circuit and one leg of a load circuit, a second pair of conductors, the units of which are designed to be connected in the other legs of the feed circuit and the load circuit respectively, a pair of terminals for connection with the series coils of a regular meter, one of which terminals is permanently in circuit with one of the conductors of the first pair, a switch member having a conductor electrically connected to the other terminal and normally in contact with another one of said conductors connected to the feed and load circuits, means for short circuiting a pair of said conductors connected to the feed and load circuits and for operating the switch member, said means having a conductor for engaging the switch conductor and being designed to be connected in the testing meter circuit, and a second pair of terminals designed to be connected in the meter circuit and respectively with the others of said conductors connected to the feed and load circuits, one of the members of said pairs of conductors having means for connection with the testing meter circuit, substantially as and for the purpose set forth.

5. A meter testing system comprising a plurality of relatively fixed conductors, some being connected between the meter and the feed circuit and others being connected between the meter and the load circuit, and one being normally disconnected from the meter, the connections between the meter and two of the conductors connected thereto including separate, movable conductors in circuit with the meter and normally in circuit with said two of the conductors, means for short-circuiting said two of the conductors, at a point between the movable conductors and the circuit legs connected to said two of the conductors, and for breaking the circuit between said movable conductors and said two of the conductors, and for completing the circuit between one of the movable conductors and the conductor disconnected from the meter, and a meter testing circuit having one leg designed to be connected in series with the first-mentioned meter, at a point between one of the movable conductors and the feed circuit and having its other leg provided with means for electrical connection with the feed circuit, substantially as and for the purpose set forth.

6. A meter testing system comprising a plurality of conductors, some being connected between the meter and the feed circuit, others being connected between the meter and the load circuit, and one being normally an idle conductor, the connections between the meter and one of the conductors connected to the load circuit including a movable conductor connected in circuit with the meter and normally in circuit with said one of the conductors, means for short-circuiting said one of the conductors and a conductor connected to the feed circuit, at a point between the movable conductor and the circuit legs connected to the conductors to be short-circuited, and for breaking the circuit between the movable conductor and said one of the conductors, and for completing the circuit between the movable conductor and the idle conductor, and the connections between the meter and another of the conductors connected to the load circuit and another of the conductors connected to the feed circuit, including separate, movable conductors connected in circuit with the meter, one of the separate, movable conductors being normally connected to the last-mentioned conductor connected to the load circuit and movable into electrical connection with the idle conductor, and the other of the separate, movable conductors being normally in circuit with the last-mentioned conductor connected to the feed circuit, means for short-circuiting said last-mentioned conductors connected to the load and feed circuits, at a point between the separate, movable conductors and the load and feed circuit legs connected to the last-mentioned conductors to be short-circuited, and for breaking the normal circuit from said separate, movable conductors, and for completing the circuit between one of said separate, movable conductors and the idle conductor, the last-mentioned means including a conductor for making electrical connection with the other of said separate, movable conductors, and a meter testing circuit having one leg designed to be connected to the conductor of said last-mentioned means and its other leg designed to be connected to the feed circuit, substantially as and for the purpose specified.

7. A meter testing system comprising a plurality of conductors, some being connected between the meter and the feed circuit, others being connected between the meter and the load circuit, and one being normally an idle conductor, the connections between the meter and one of the conductors connected to the load circuit including a movable conductor connected in circuit with the meter and normally in circuit with said one of the conductors, means for short-circuiting said one of the conductors and a conductor connected to the feed circuit, at a point between the movable conductor and the circuit legs connected to the conductors to be short circuited, and for breaking the circuit between the movable conductor and said one of the conductors, and for completing the circuit between the movable conductor and the idle conductor, said means including separate terminals connected, respectively, to the conductors to be short-circuited, a movable conductor for connecting said separate terminals, and a member coacting with the first-mentioned movable conductor, and the connections between the meter and another of the conductors connected to the load circuit and another of the conductors connected to the feed circuit, including separate, movable conductors connected in circuit with the meter, one of the separate, movable conductors being normally connected to the last-mentioned conductor connected to the load circuit and movable into electrical connection with the idle conductor, and the other of the separate, movable conductors being normally in circuit with the last-mentioned conductor connected to the feed circuit, means for short-circuiting said last-mentioned conductors connected to the load and feed circuits, at a point between the separate, movable conductors and the circuit legs connected to the last-mentioned conductors to be short-circuited, and for breaking the normal circuit from said separate, movable conductors, and for completing the circuit between one of said separate, movable conductors and the idle conductor, said last mentioned means including separate terminal connected, respectively, to the last-mentioned conductors to be short-circuited, a movable conductor for connecting said last-mentioned separate terminals, a member for coacting with the separate, movable conductors to move the same from their normal position and to cause one of them to complete the circuit with the idle conductor, and another conductor for making electrical connection with the other of the separate, movable conductors, and a meter testing circuit having one leg designed to be connected to the last-mentioned conductor of the last-mentioned means and its other leg designed to be connected to the feed circuit, substantially as and for the purpose set forth.

8. A meter testing system comprising a pair of conductors, the units of which are designed to be connected respectively to one leg of a feed circuit and one leg of a load circuit, and a second pair of conductors the units of which are designed to be connected to the other legs of the feed circuit and the load circuit respectively, two pairs of terminals designed to be connected respectively to the coils of the regular meter, one of the terminals being permanently in circuit with the one of the conductors of the first pair connected in the feed circuit; a normally idle conductor, two switch members, one having a contact normally engaged with the other conductor of the first pair which conductor is connected in the load circuit, the switch member being movable to carry its contact into connection with the idle conductor, and the other switch member having contacts normally engaged with both conductors of the second pair and being movable to carry one contact thereof into connection with the idle conductor, a pair of sockets having terminals connected respectively to the conductors of the pairs, and plugs movable into the sockets to short circuit the terminals thereof, the plugs having means for engaging the switch members to move the same to carry their contacts out of connection with the members of said pairs of conductors normally electrically connected therewith and to carry a contact of each switch member into connection with the idle conductor as the plugs move into their sockets, the plug, coacting with the switch member having two contacts, being provided with a conductor for engaging one of the contacts of said switch member, substantially as and for the purpose described.

9. A meter testing system comprising a pair of conductors, the members of which are designed to be connected respectively to one of the outside mains of a three-wire feed circuit and to one leg of a load circuit, a second pair of conductors, the members of which are designed to be connected to the other outside main of the three-wire feed circuit and the other leg of the load circuit, two pairs of terminals, each pair being designed to be connected to opposite ends of one of the coils of the regular meter, and one of the terminals being permanently connected to the outside conductor of the first pair, and the three remaining meter terminals being normally electrically connected with the three remaining conductors, shiftable switches having contacts electrically connected to said three remaining meter terminals and normally electrically connected to the three remaining conductors, a normally idle conductor arranged to be engaged by a contact of each switch, and means for short circuiting the conductors of each pair of conductors and moving the switches to carry their contacts out of connection with the members of said pairs of conductors normally electrically connected therewith, and to carry the two of such contacts normally electrically connected to the load circuit conductors, into connection with the normally idle conductor whereby the coils of the meter are connected directly together in series, said means comprising a conductor by which the contact of the switch normally connected to the outside main conductor of the second pair, is connected in the meter testing circuit, substantially as and for the purpose specified.

10. A meter testing system comprising outside main conductors, load circuit conductors and a neutral conductor, two pairs of terminals one terminal being permanently connected to one of the outside main conductors, and the remaining three terminals being normally in electric circuit with the second outside main conductor and the load circuit conductors, means for short-circuiting each of the outside main conductors and the corresponding load circuit conductor, switches having contacts operable to normally connect three of the meter terminals in circuit with the load circuit conductors and said second outside main conductor and being shiftable out of their normal position to disconnect the load circuit from the meter, an idle conductor arranged to be engaged by contacts of the switches to connect the meter coils in series, upon the operation of the switches out of their normal position, one of said switches being operable to break the connection thereof with the said second outside main conductor, and means associated with said short circuiting means for operating the switches, the latter means including a conductor coacting with the switch contact normally in circuit with the second outside main conductor, substantially as and for the purpose set forth.

11. A meter testing system comprising a base having a recess and a socket, a plurality of conductors carried by the base, some of the conductors being connected between the meter and the feed circuit, and others between the meter and the load circuit, the connections between one of the conductors and the meter including a movable conductor in the recess, the movable conductor being connected in circuit with the meter and normally in circuit with said one of the conductors, means for short-circuiting said one of the conductors and another of said conductors, at a point between the movable conductor and the circuit legs connected to the conductors to be short-circuited, and for breaking the circuit between the movable conductor and said one of the conductors, said means being movable in the socket and being provided with a conductor for making electrical connection with the movable conductor in the recess, and a meter testing circuit having one leg designed to be connected to the conductor of said means and its other leg designed to be connected to the feed circuit, substantially as and for the purpose specified.

12. A meter testing system comprising a base block and a socket block mounted on the former block and separable therefrom, the base block having a recess opening from its face opposed to the socket block, and the socket block having a socket communicating with the recess, a plurality of conductors carried by the base, some of the conductors being connected between the meter and the feed circuit, and others between the meter and the load circuit, the connections between one of the conductors and the meter including a movable conductor in the recess, the movable conductor being connected in circuit with the meter and normally in circuit with said one of the conductors, means for short-circuiting said one of the conductors and another of the conductors, at a point between the movable conductor and the circuit legs connected to the conductors to be short circuited, and for breaking the circuit between the movable conductor and said one of the conductors, said means being movable in the socket and being provided with a conductor for making electrical connection with the movable conductor in the recess, and a meter testing circuit having one leg designed to be connected to the conductor of said means and its other leg designed to be connected to the feed circuit, substantially as and for the purpose described.

13. A meter testing system comprising a base having a recess and a socket, a plurality of conductors carried by the base, some of the conductors being connected between the meter and the feed circuit, and others between the meter and the load circuit, the connections between one of the conductors and the meter including a movable conductor in the recess, the movable conductor being connected in circuit with the meter and normally in circuit with said one of the conductors, means for short-circuiting said one of the conductors and another of said conductors, at a point between the movable conductor and the circuit legs connected to the conductors to be short-circuited, and for breaking the circuit between the movable conductor and said one of the conductors, said means including separate terminals in the socket connected respectively to the conductors to be short-circuited, a movable conductor for connecting the terminals, and means associated with the last mentioned movable conductor for entering the recess and actuating the first-mentioned movable conductor, and a meter testing circuit designed to be connected between the movable conductor in the recess and the feed circuit, substantially as and for the purpose set forth.

14. A meter testing system comprising a base block and a socket block mounted on the former block and separable therefrom, the base block having a recess opening from its face opposed to the socket block, and the socket block having a socket communicating with the recess, the portion of the socket contiguous to the recess being of less size than said recess, a plurality of conductors carried by the face of the socket block opposed to the base block, some of the conductors being connected between the meter and the feed circuit, and others between the meter and the load circuit, one of the conductors having a portion thereof exposed on said face of the socket block at the top of the recess, the connections between said one of the conductors and the meter including a movable conductor in the recess connected in circuit with the meter and normally in circuit with the exposed portion of said one of the conductors, means for short-circuiting said one of the conductors and another of said conductors, at a point between the movable conductor and the circuit legs connected to the conductors to be short-circuited, and for breaking the circuit between the movable conductor and said one of the conductors, said means being movable in the socket and being provided with a conductor for making electrical connection with the movable conductor, and a meter testing circuit having one leg designed to be connected to the conductor of said means and its other leg designed to be connected to the feed circuit, substantially as and for the purpose specified.

15. A meter testing system comprising a base block and a socket block mounted on the former block and separable therefrom, the base block having a recess opening from its face opposed to the socket block, and the socket block having a socket communicating with the recess, the portion of the socket contiguous to the recess being of less size than said recess, a plurality of conductors carried by the face of the socket block opposed to the base block, some of the conductors being connected between the meter and the feed circuit, and others between the meter and the load circuit, one of the conductors and a companion conductor having portions thereof exposed on said face of the socket block at the top of the recess, one of said companion conductors being connected in the feed circuit and the other in the load circuit, and the connections between the meter and said companion conductors including a pair of separate conductors movable in the recess and connected in circuit with the meter and normally in circuit with the exposed portions of said companion conductors, means for short-circuiting the companion conductors, at a point between the separate conductors and the circuit legs connected to said companion conductors, said means being provided with a conductor for making electrical connection with one of the movable conductors, and a meter testing circuit having one leg designed to be connected to the conductor of said means and its other leg designed to be connected to the feed circuit, substantially as and for the purpose described.

16. A meter testing system comprising a base having a pair of recesses and a pair of sockets communicating with the recesses, a plurality of conductors carried by the base, some of the conductors being connected between the meter and the feed circuit, and others between the meter and the load circuit, the connections between one of the conductors and the meter including a movable conductor in one of the recesses, the movable conductor being connected in circuit with the meter and normally in circuit with said one of the conductors, and the connections between two of the other conductors and the meter including a pair of separate, movable conductors in the other recess, the last-mentioned movable conductors being connected in circuit with the meter and normally in circuit with said two conductors, and short-circuiting means comprising members movable into the sockets to complete the short circuiting, members coacting with the movable conductors for breaking the circuits between said movable conductors and the first-mentioned conductors in circuit therewith, and another movable conductor for making connection with one of the separate, movable conductors, and a meter testing circuit having one leg designed to be connected to the last-mentioned conductor and its other leg designed to be connected to the feed circuit, substantially as and for the purpose set forth.

17. A meter testing system comprising a base including a block formed with a pair of recesses, a socket block mounted on the former block and having socket openings alined with the recesses, two pairs of conductors located between the blocks, each pair extending across one of the recesses, each socket including terminals connected respectively to the conductors of one pair, two pairs of meter terminals mounted on the base one being permanently electrically connected to one of said conductors, and the three remaining terminals being normally electrically connected with the three remaining conductors, switch members located in the recesses respectively, one having two conductors connected respectively to the members of one pair of meter terminals and the other switch having a conductor connected in circuit with the conductor paired with the terminal permanently connected in circuit with one of the conductors, an idle bar having its opposite ends normally lying on the bottoms of the recesses in position to be engaged by conductors of the switches, plugs movable into the sockets to short circuit the terminals thereof, each plug having an arm projecting in advance thereof to operate the switches, the arm of the plug for entering the recess in which the switch having two conductors is located having a conductor to make contact with the one of the conductors of said switch not engaging the idle bar, substantially as and for the purpose specified.

In testimony whereof, we have hereunto signed our names in the presence of two attesting witnesses, at Syracuse, in the county of Onondaga, in the State of New York, this 15th day of October, 1913.

CARL H. BISSELL.
HAROLD P. HASTINGS.

Witnesses:
C. C. SCHOENECK,
WM. CORNELL BLANDING.